(12) United States Patent
Benthien et al.

(10) Patent No.: US 8,490,922 B2
(45) Date of Patent: Jul. 23, 2013

(54) LINING FOR AN AIRCRAFT

(75) Inventors: Hermann Benthien, Sottrum (DE);
Radoslaw Lazar, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 805 days.

(21) Appl. No.: 12/521,240

(22) PCT Filed: Jan. 18, 2008

(86) PCT No.: PCT/EP2008/050537
§ 371 (c)(1),
(2), (4) Date: Dec. 14, 2009

(87) PCT Pub. No.: WO2008/090084
PCT Pub. Date: Jul. 31, 2008

(65) Prior Publication Data
US 2010/0096500 A1    Apr. 22, 2010

Related U.S. Application Data

(60) Provisional application No. 60/881,870, filed on Jan. 23, 2007.

(30) Foreign Application Priority Data

Mar. 9, 2007    (DE) .......................... 10 2007 011 627

(51) Int. Cl.
*B64C 1/00*    (2006.01)
*E04B 1/343*    (2006.01)

(52) U.S. Cl.
USPC .................. 244/119; 244/129.1; 52/1; 52/98

(58) Field of Classification Search
USPC .................. 244/118.1, 118.5, 119, 120, 121, 244/129.1, 129.2, 129.4; 52/1, 98; 454/71, 454/76
See application file for complete search history.

(56) References Cited

U.S. PATENT DOCUMENTS

| | | | | |
|---|---|---|---|---|
| 3,258,890 | A | * | 7/1966 | Dirkse .......................... 52/309.9 |
| 3,938,764 | A | * | 2/1976 | McIntyre et al. ......... 244/117 R |

(Continued)

FOREIGN PATENT DOCUMENTS

| | | |
|---|---|---|
| DE | 4002447 C1 | 3/1991 |
| EP | 0905018 A2 | 3/1999 |

(Continued)

OTHER PUBLICATIONS

International Search Report with Written Opinion for PCT/EP/2008/050537 dated Aug. 4, 2008.

(Continued)

*Primary Examiner* — Joseph W Sanderson
(74) *Attorney, Agent, or Firm* — Jenkins, Wilson, Taylor & Hunt, P.A.

(57) ABSTRACT

A lining for an aircraft. The lining separates an intermediate space from an interior space of the aircraft in a pressuretight manner. The lining panels extend either substantially horizontally or are fastened approximately vertically on a lining framework formed by profiles for connection to the fuselage cell. At least one of the lining panels allows automatic pressure equalization between the interior space and the intermediate space in the event that the pressure in the interior space drops to something in the order of 0 hPa. This pressure corresponds to the air pressure prevailing at an altitude above 10,000 m. Mounts of the lining panels are provided with predetermined breaking points. The predetermined breaking points are formed in particular by plastic nuts, the thread of which tears away when a critical load-bearing capacity is exceeded.

7 Claims, 5 Drawing Sheets

U.S. PATENT DOCUMENTS

| | | | | | |
|---|---|---|---|---|---|
| 4,033,247 | A | * | 7/1977 | Murphy | 454/76 |
| 4,269,376 | A | * | 5/1981 | Haux et al. | 244/117 R |
| 4,276,725 | A | * | 7/1981 | Ash | 52/167.9 |
| 4,383,666 | A | * | 5/1983 | Allerding et al. | 244/118.5 |
| 4,703,908 | A | * | 11/1987 | Correge et al. | 244/118.5 |
| 4,899,960 | A | | 2/1990 | Hararat-Tehrani et al. | |
| 5,085,017 | A | | 2/1992 | Hararat-Tehrani | |
| 5,137,231 | A | * | 8/1992 | Boss | 244/118.5 |
| 5,871,178 | A | * | 2/1999 | Barnett et al. | 244/118.5 |
| 6,029,933 | A | * | 2/2000 | Holman et al. | 244/118.5 |
| 6,129,312 | A | * | 10/2000 | Weber | 244/118.5 |
| 6,264,141 | B1 | * | 7/2001 | Shim et al. | 244/118.5 |
| 6,435,455 | B1 | * | 8/2002 | Holman et al. | 244/118.5 |
| 7,416,157 | B2 | * | 8/2008 | Guard et al. | 244/131 |
| 2005/0224647 | A1 | | 10/2005 | Tubbs | |
| 2007/0089746 | A1 | | 4/2007 | Mitchell et al. | |
| 2010/0096500 | A1 | * | 4/2010 | Benthien | 244/119 |

FOREIGN PATENT DOCUMENTS

| | | |
|---|---|---|
| SU | 325197 | 1/1972 |
| SU | 573937 | 1/1984 |
| WO | WO 2008/090084 A2 | 7/2008 |
| WO | WO 2008/090084 A3 | 7/2008 |

OTHER PUBLICATIONS

Decision to Grant for Russian Patent Application Serial No. 2009/130306/11 dated Mar. 6, 2012.

* cited by examiner

LINING FOR AN AIRCRAFT

CROSS-REFERENCE TO RELATED APPLICATIONS

This application is a 35 USC Section 371 national stage application of and claims priority to PCT/EP2008/050537 filed Jan. 18, 2008, which claims the benefit of and priority to U.S. Provisional Application No. 60/881,870, filed Jan. 23, 2007 and German Patent Application No. 10 2007 011 627.8 filed Mar. 9, 2007, the entire disclosures of which are herein incorporated by reference.

FIELD OF THE INVENTION

The invention relates to a lining for a fuselage cell of an aircraft, comprising a multiplicity of lining panels adjoining one another, an intermediate space existing between the fuselage cell and the lining.

BACKGROUND OF THE INVENTION

Known embodiments of lining panels for the lining of fuselage cells of aircraft, and in particular for use in propeller-powered aeroplanes, must meet a large number of requirements.

Firstly, the lining panels must have adequate sound permeability. Furthermore, the lining panels should provide adequate electromagnetic shielding in case the electrical lines within the aircraft do not have adequate shielding. In addition, the lining panels must be adequately isolated from deformations of the fuselage cell, because insufficiently elastic fastening of the panels forming the lining to the fuselage cell causes stresses. The lining panels themselves only withstand a pressure difference of up to 80 hPa. In the case of a sudden drop in pressure in the interior space of the fuselage cell, furthermore, a pressure equalization must be possible through the lining without the panels intruding into the passenger compartment and possibly injuring the passengers. Finally, the lining is also intended to allow adequate compensation for production tolerances.

Lining panels of this type are produced by sandwich panels, which have, for example, a honeycomb core with outer layers applied to both sides. The outer layers are formed with preference by a fibre reinforced thermosetting polymer material, which is provided at least in certain regions with a metal backing, to achieve an adequate electromagnetic shielding effect with at the same time adequate sound permeability. The lining panels are usually connected to profiles, which are in turn connected to the fuselage cell by means of mounts. The profiles, arranged with preference in the manner of a truss, form what is known as the "lining framework". The pressure tight sealing between the lining panels and the profiles is performed by peripheral seals. The required pressure equalization between the interior space of the fuselage cell and the intermediate space located between the lining and the outer skin of the fuselage cell takes place in the case of a sudden drop in pressure in the interior space of the fuselage cell (known as "rapid decompression") through additional ventilation flaps in the lining.

SUMMARY OF THE INVENTION

The object of the invention is to meet the range of requirements described above for a lining of an aircraft and to dispense with the need for the additional, weight-intensive ventilation flaps of the known embodiments of linings.

This object is achieved by a lining for a fuselage cell of an aircraft, comprising a multiplicity of lining panels adjoining one another, an intermediate space existing between the fuselage cell and the lining, characterized in that at least one lining panel has such a connection to the fuselage cell that, when there is a rapid drop in pressure between an interior space of the fuselage cell and the intermediate space, at least one lining panel exposes at least one gap to allow pressure equalization.

The fact that at least one lining panel has such a connection to the fuselage cell that, when there is a rapid drop in pressure between an interior space of the fuselage cell and the intermediate space, at least one lining panel exposes at least one gap to allow pressure equalization means that, in an emergency, automatic pressure equalization can take place between the space inside the fuselage cell and the intermediate space obtained between the lining and the outer skin of the fuselage cell.

In the case of a sudden drop in pressure in the interior space to a value of approximately 0 hPa, the positive pressure of about 500 hPa that still continues to exist for a short time in the intermediate space has the effect that the at least one lining panel is pressed in the direction of the interior space, exposing gaps for automatic pressure equalization.

With preference, a number of lining panels will be formed in such a way as to achieve a decompression effect that is as uniform as possible over the entire longitudinal extent of the fuselage cell.

Different fastening systems are respectively provided here for substantially horizontally or vertically fitted lining panels.

In the case of the substantially horizontally extending lining panels, which serve in particular for lining the ceiling of the interior space of the aircraft, the suspension of the at least one lining panel takes place by means of at least one cable, which leads from two opposite sides of the lining panel to a holding point arranged in the centre of the lining panel and having a predetermined breaking point.

This refinement makes flexible and weight-saving suspension of the horizontally extending lining panels possible.

A development of the lining provides that at least one holding point of the lining panel has a predetermined breaking point.

This ensures that, when there is a sufficiently great pressure difference between the interior space and the intermediate space—as occurs when there is a sudden drop in pressure in the interior space of the fuselage cell ("rapid decompression")—, the at least one lining panel is automatically lowered with respect to the adjacent lining panels, and consequently exposes gaps for decompression. The predetermined breaking point is formed with preference by a threaded bolt with a screwed-on plastic nut, the thread of which tears away when a critical load-bearing capacity is exceeded and allows the panel to drop downwards, limited by the length of the cable. Arranged on the threaded bolt is a cable guide for fastening or guiding the cable. The plastic nut may be formed, for example, by a thermosetting or thermoplastic polymer material, such as for example by polyethylene (PE), polyamide (PA), polypropylene (PP) or polyetherether ketone (PEEK). Alternatively, the predetermined breaking point may also be formed by a bolt with a cross section reduced in a locally defined manner, or the like.

A further refinement of the lining according to the invention provides that the lining panels extend substantially vertically on horizontally and vertically arranged profiles of a lining framework, which serves for the fastening of the lining to the fuselage cell. The connecting of the at least one (detachable) lining panel is performed with at least one mount arranged in the region of an edge of the at least one lining panel, the at least one mount being connected to the profiles of the lining framework, which in turn is connected to the fuselage cell.

As a result, automatic pressure equalization between the interior space (passenger cabin) and the intermediate space is possible in the case of a sudden drop in pressure in the interior space.

The mount comprises an inner holder and an outer holder, which can be screwed, clamped or latched with one another to clamp in the edge region of the lining panel. Seals ensure the pressure tight sealing between the lining panels and the profiles. The inner holder is screwed onto a rod, which is led through at least one hole in the profile and onto which, in particular, a plastic nut is screwed in the region of a threaded portion as a predetermined breaking point.

In the case of a sudden drop in pressure in the interior space, the lining panel is pressed by a high force in the direction of the interior space. The strength of the force acting exceeds the previously fixed critical load-bearing capacity of the plastic nut, so that the latter tears out and the rod can be displaced freely in the hole in the profile. The rod has a stop at the end, to prevent it from being pulled through the hole and to avoid uncontrolled falling out of the lining panel. Since, with preference, the at least one lining panel is provided with the mounts in the corner regions, the movement of the detachable vertical lining panels takes place substantially parallel to the vertical, so that canting or jamming of the rods in the holes in the profiles is ruled out.

Instead of a plastic nut, other design variants may be provided for creating a predetermined breaking point. For example, bolts with cross sections reduced in a defined manner in the region of the predetermined breaking point or metals and/or polymer materials with a defined lower tensile strength in comparison with the rod in the mount may be used. The lining according to the invention in any event allows automatic pressure equalization, so that it is possible to dispense with the previously required weight-intensive pressure equalizing flaps.

Further advantageous refinements of the lining are presented in the further patent claims.

BRIEF DESCRIPTION OF THE DRAWINGS

In the drawing.

In the drawing, the same structural elements have in each case the same reference numerals.

DETAILED DESCRIPTION OF THE DRAWINGS

Figure 1:
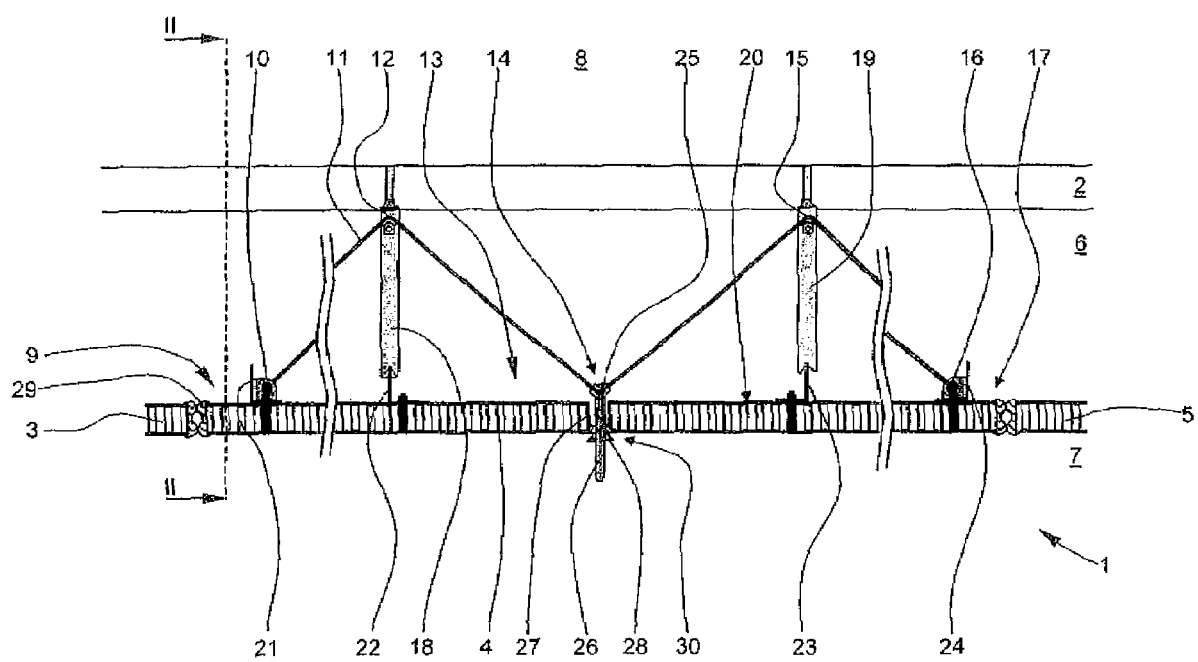
FIG. 1 shows a side view of a detail from the lining according to the invention with substantially horizontally extending lining panels in the normal state.

FIG. 1 shows a detail from the lining in the normal state, that is to say without the lining panel being lowered.

A lining 1 of the fuselage cell 2 of an aircraft is formed, inter alia, by three substantially horizontally extending lining panels 3 to 5. The lining panels 3 to 5 are formed in a known sandwich type of construction, for example with a honeycomb core and outer layers of a fibre reinforced polymer material applied on both sides. The lining 1 produces an intermediate space 6, which is separate from the interior space 7 of the fuselage cell 2 of the aircraft. In the region of the exterior space 8 outside the fuselage cell 2 there prevails an atmospheric pressure corresponding to the altitude of the aircraft at the time of close to 0 hPa. In the normal operating state of the aircraft, at an altitude of, for example, 10,000 m, a pressure of approximately 500 hPa prevails both in the intermediate space 6 and in the interior space 7 of the aircraft, corresponding to a height of approximately 2000 m above sea level.

In the region of a first edge 9 of the lining panel 4 there is a first articulation point 10. Starting from this first articulation point 10, a cable 11 extends over a first cable guide 12 to a holding point 14 arranged in a central region 13 of the lining panel 4. From there, the cable 11 is led over a second cable guide 15 to a second articulation point 16 in the region of the second edge 17 of the lining panel 4. The cable guides 12, 15 are arranged on two supports 18, 19, which can be adjusted in length and are fastened to the fuselage cell 2. Four profiles 21 to 24 are fastened on an inner side 20 of the lining panel 4. The profiles 21 to 24 are fastened, for example, by screws, rivets, clamping bolts or the like, which are introduced into bushes inserted into the lining panel 4 (known as "inserts"). Seals, which are not represented, may be provided between the profiles 21 to 24 and the inner side 20 of the lining panel 4. The profiles 21 and 24 form the two articulation points 10, 16, in which the cable 11 is fastened by means of suitable fittings. In addition, the supports 18, 19 hold up the lining panel in the region of the profiles 22 and 23. The cable 11 is under a prestress, so that, in the normal state that is shown, the lining panel 4 is drawn against the two supports 18, 19 counter to the effect of gravitational force. To achieve adequate lateral guidance of the lining panel 4, the supports 18, 19 have at the ends V-shaped grooves, which are not designated any more specifically, for respectively receiving profiles 22, 23. The profiles 22 and 23 are only under tensile force as they lie in these V-shaped grooves, providing adequate mobility of the lining panel 4 to compensate for deformations of the fuselage cell 2 and production-related tolerances.

The holding point 14 has a third cable guide 25. This is fastened to a threaded bolt 26, which is led through a hole 27 in the central region 13 of the lining panel 4 and onto which, with preference, a plastic nut 28 is screwed to fasten the panel. An insert, a bush for leading through the threaded bolt 26, which optionally has a peripheral rim on which the plastic nut can rest, may likewise be provided in the hole 27. As an alternative or in addition, the plastic nut 28 may have an integrally joined-on annular rest for introducing force and sealing the hole 27 in the lining panel 4. In the region of the first and second edges 9, 17 of the lining panel 4 and at edges of the lining panels 3, 5 adjoining on both sides there are seals in each case, only one seal 29 of which, in the region of the first edge 9 of the lowerable lining panel 4, is provided with a reference numeral as representative of the others. The seals 29 provide the effect of a largely pressure tight termination between the intermediate space 6 and the interior space 7.

Acting together with the threaded bolt 26, the plastic nut 28 forms a predetermined breaking point 30, which ruptures when a critical load-bearing capacity is exceeded. If the pressure in the interior space 7 of the fuselage cell 2 suddenly drops to something in the order of 0 hPa (known as "rapid decompression"), a positive pressure of approximately 500 hPa still continues to prevail for a short time in the intermediate space 6. As a result of this briefly continuing pressure difference, such a high mechanical force acts on the inner side 20 of the lining panel 4 that the critical load-bearing capacity required for defined tearing away of the threads of the plastic nut 28 on the threaded bolt 26 is exceeded and brings about the controlled lowering of the lining panel 4 downwards in the vertical direction by the previously fixed amount. The amount of lowering depends in particular on the length of the cable 11. Within the entire lining 1, a number of lining panels 4 that lower automatically when there is a drop in pressure may be provided.

The lowering of the lining panel 4 may take place substantially parallel to the horizontal or else only on one side, that is to say the lining panel 4 is pivoted about an imaginary pivot point lying in the region of the first edge 9 and the actual lowering by the predefined amount only takes place in the region of the second edge 17. Such an effect can be achieved, for example, by a cable stopper in the region of the first cable guide 12.

Figure 2:
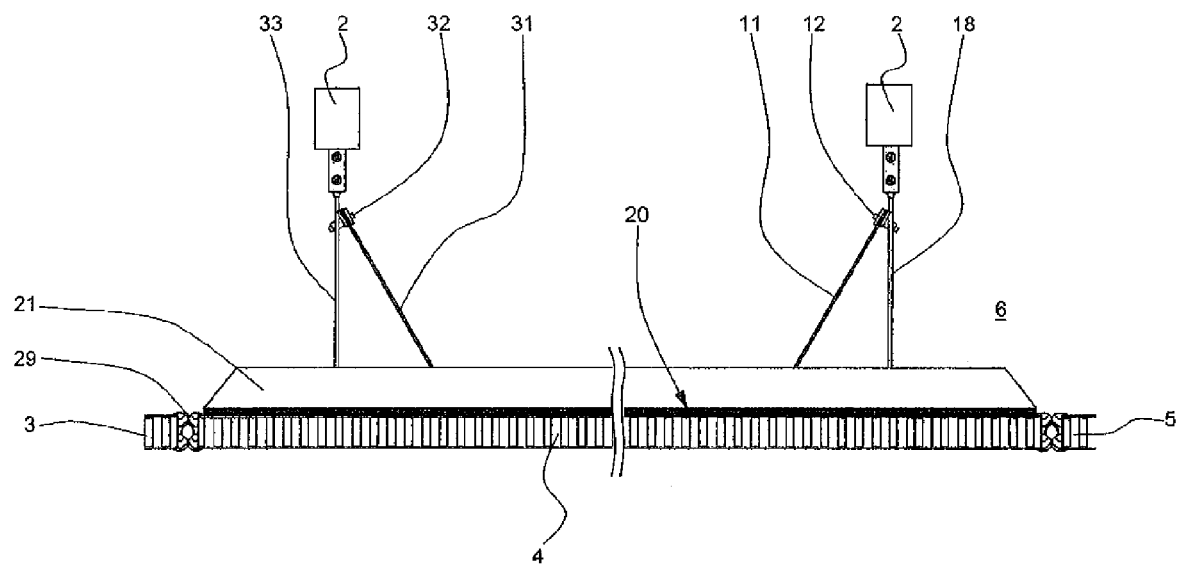
FIG. 2 shows a view of the lining along the sectional line II-II of FIG. 1.

FIG. 2 shows a section through the lining along the sectional line II-II of FIG. 1.

The lining panel 4 is adjoined on both sides by the lining panels 3, 5. The profile 21 extends substantially over the entire inner side 20 of the lining panel 4. Seals, of which only the seal 29 is provided with a reference numeral for the sake of a better overview of the drawing, enclose the panels 3 to 5, with preference on all sides. As a result, a substantially pressure tight termination of the intermediate space 6 is achieved.

The support 18, which can with preference be adjusted in length, is connected to the fuselage cell 2 and carries the first cable guide 12. In a way corresponding to the path followed by the cable 11 (cf. FIG. 1), there extends a further cable 31. The cable is likewise led over a cable guide 32, which is fastened to a further support 33. The support 33 has the same construction as the two (front) supports 18, 19. Behind the support 33 there is, perpendicularly with respect to the plane of the drawing, a further support, which is not represented in FIG. 2 but has a cable guide for the cable 31, the structural form of which likewise respectively corresponds to that of the support 18 or the cable guide 12 (cf. FIG. 1). Both cables 11, 31 extend such that they are inclined with respect to the horizontal by an angle of approximately 60°, whereby the lateral guidance of the lining panel 4 in the horizontal is improved.

With preference, the cables 11, 31 are formed by an alloy of a stainless high-grade steel or a titanium alloy. Alternatively, the use of high-strength fibres, such as for example carbon fibres, glass fibres, aramid fibres, ceramic fibres or the like, is also possible. Instead of the cables 11, 31, narrow bands or chains may also be used. For carrying out maintenance work, for example on lines in the region of the intermediate space, the lining panel 4 can be easily lowered by unscrewing the plastic nut 28 by an amount fixed by the length of the cables 11, 31, of for example up to 10 cm.

Figure 3:
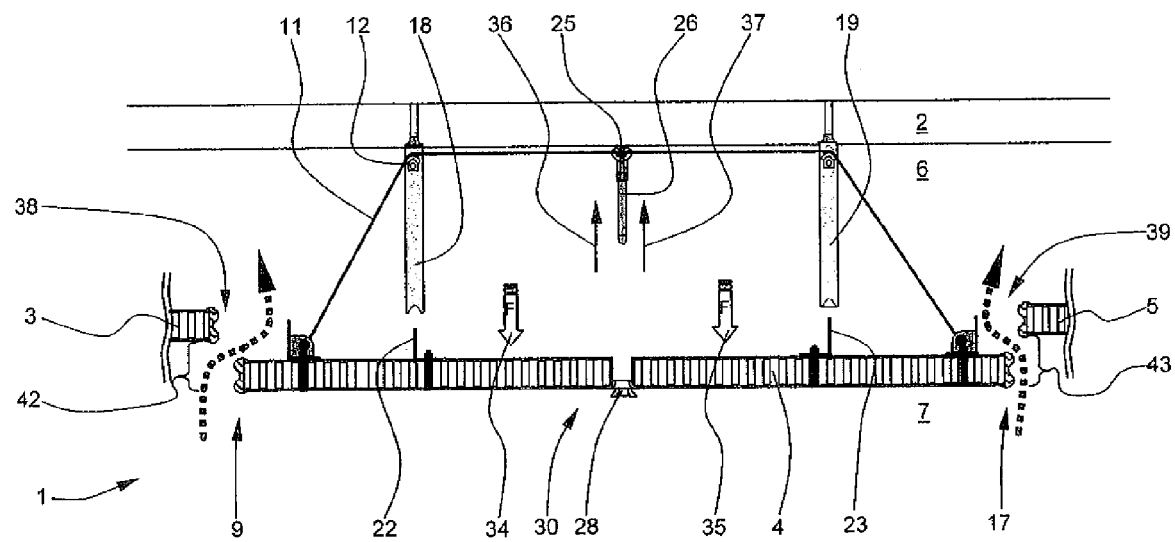
FIG. 3 shows a side view of the lining according to the invention after pressure equalization has taken place, and FIGS. 4-7 respectively show a detail of the lining according to the invention with substantially vertically extending lining panels.

FIG. 3 illustrates the detail from the lining according to FIG. 1 in a lowered (decompressed) state.

Since a high positive pressure of approximately 500 hPa prevails in the intermediate space 6 with respect to the interior space 7 as a result of the drop in pressure, the lining panel 4 of the lining 1 is pressed downwards in the vertical direction by a force F, which acts in the direction of the white arrows 34, 35. The predetermined maximum force effect that the predetermined breaking point 30 in the form of the threaded bolt 26 and the plastic nut 28 can withstand is thereby exceeded, so that the threaded bolt 26 is abruptly pulled out from the plastic nut 28 together with the cable 11, fastened in the third cable guide 25, in the direction of the black arrows 36, 37 and moves upwards. In return, the lining panel 4 is lowered downwards in the direction of the arrows 34, 35, the profiles 22, 23 coming away from the shaped recesses or grooves in the supports 18, 19. As a result, two gaps 38, 39 are opened in relation to the adjacent lining panels 3, 5, with the result of pressure equalization between the interior space 7 and the intermediate space 6, as represented by the dash-dotted arrows 40, 41. In the decompressed state, the lining panel 4 is lowered in relation to the adjacent lining panels 3, 5 by the distances 42, 43. Further lowering of the lining panel 4 does not take place, because the length of the cable 11 is limited. This avoids uncontrolled dropping down of the lining panel 4.

Alternatively, it is possible, for example, to lower the lining panel 4 only in the region of the second edge 17, while the first edge 9 remains substantially in its position. This can be achieved by a cable clamp being provided in the region of the first cable guide and having the effect of blocking the run of the cable 11 through the first cable guide 12.

The gaps 38, 39 dispense with the need for separate, weight-increasing ventilation flaps in the lining 1.

FIGS. 4 to 7 respectively show a detail from the lining according to the invention, with substantially vertically extending lining panels. In this configuration, the detachable connecting of the lining panels takes place by a multiplicity of mounts, which connect the lining panels to the profiles of the lining framework extending under them, with preference at corner regions and/or along edges of the said panels.

Figure 4:
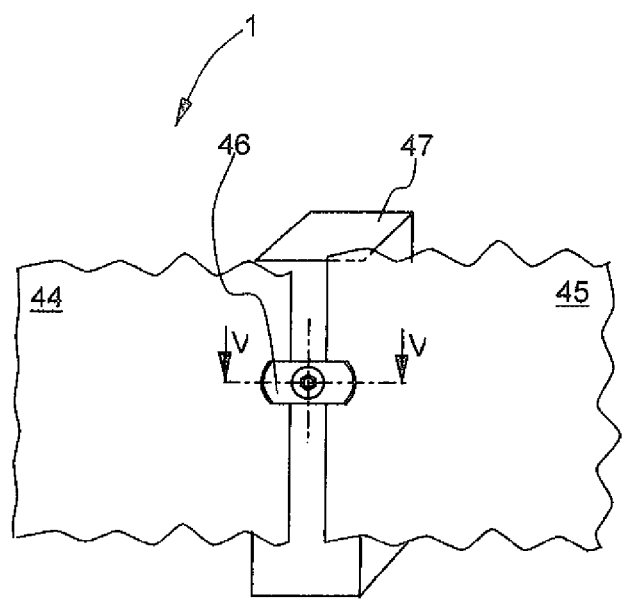

FIG. 4 illustrates two vertically arranged lining panels 44, 45, which are detachably connected by means of the mount 46 to a vertically extending (hollow) profile 47. The profile 47 is in turn part of a lining framework, which is not represented but serves for connecting the lining panel 1 to the fuselage cell of the aircraft. The internally hollow profile 47 has an approximately square cross-sectional geometry, but may in principle have any cross-sectional geometry other than this.

Figure 5:
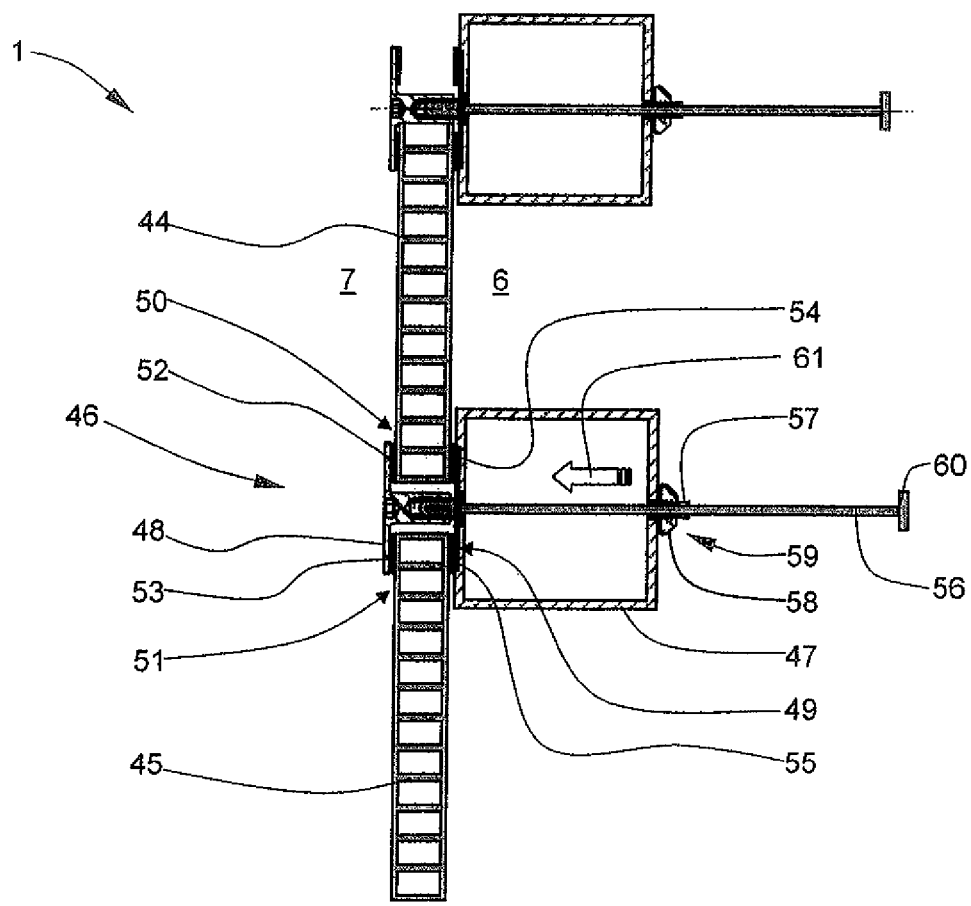
Figure 6:
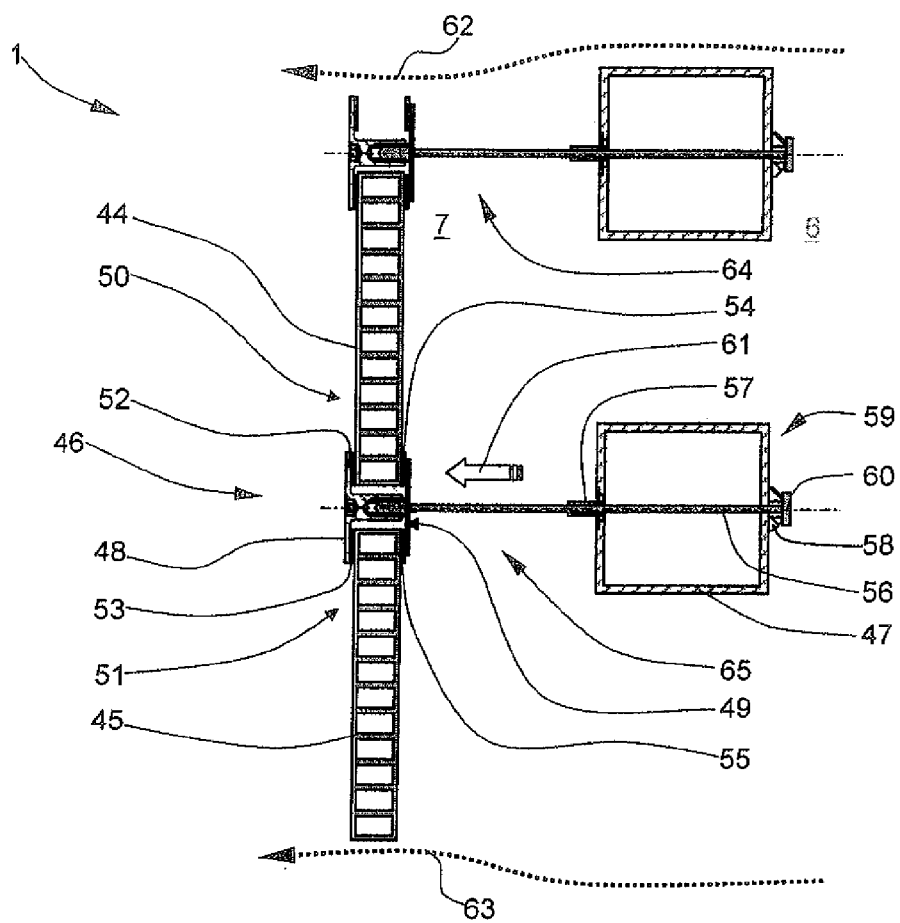

FIGS. 5 and 6 show a section through the mount 46 along the sectional line V-V of FIG. 4. In FIG. 5, the lining panel 44 is in the "normal state", while the lining panel 44 in FIG. 6 is in the "decompression state" (detached state), in which pressure equalization between the interior space 7 and the intermediate space 6 is possible in the case of a rapid drop in pressure in the interior space 7.

The mount 46 comprises, inter alia, an outer holder 48 and an inner holder 49, between which the lining panels 44, 45 are clamped at their edges. The outer holder 48 has a bar-shaped form and engages over the mutually parallel edges of the lining panels 44, 45 (cf. FIG. 4). To achieve clamping in of the lining panels 44, 45, the inner and outer holders 48, 49 are screwed to each other. The clamping in has the effect of preventing uncontrolled falling out of the lining panels 44, 45 in the decompression state.

The inner holder 49 centres itself by a recess of the profile 47. Peripheral seals 52 to 55 are provided, with preference, in the region of edges 50, 51 of the lining panels 44, 45, in order to achieve a pressure tight termination between the interior space 7 and the intermediate space 6. In this case, the seals 52 to 55 lie continuously against the profiles of the lining framework. The (hollow) profile 47 has two holes, which are not provided with a reference numeral for the sake of a better overview but through which a rod 56 is led. Seated on a threaded portion 57, which is arranged in the central region of the rod 56, there is, for example, a plastic nut 58, which is provided as a predetermined breaking point 59 and the threads of which tear away above a critical load-bearing capacity and release the rod 56 for horizontal displacement to the left. The displacement of the rod 56 through the profile 47 is limited by a stop 60 arranged at the end of the rod 56. The strength of the plastic nut 58 is chosen such that, when the permissible critical load-bearing capacity is reached or exceeded, it can tear away from the threaded portion 57 in a controlled manner and the panel can move to the left in the direction of a white arrow 61.

Above the mount 46 there is a further, correspondingly constructed mount. The lining panels 44, 45 and further lining panels that are not represented are fastened on the profiles of the lining framework by a multiplicity of such mounts.

The crucial load-bearing capacity is suddenly exceeded when there is a drop in pressure in the interior space 7, since the pressure difference which then acts on the lining panels 44, 45 of approximately 500 hPa is adequate to press the lining panels 44, 45 to the left.

In FIG. 6, the lining panels 44, 45 have already reached their end positions and, as indicated by the arrows 62, 63 represented by dotted lines, pressure equalization between the interior space 7 and the intermediate space 6 can take place through the gaps 64, 65 that are exposed between the profiles and the seals 52 to 55. This has the effect that the interior space 7 and the intermediate space 6 "merge together" to form a contiguous volume unit, so that the intermediate space 6 is ultimately subsumed in the interior space 7 (cf. grey reference numeral 6).

Figure 7:
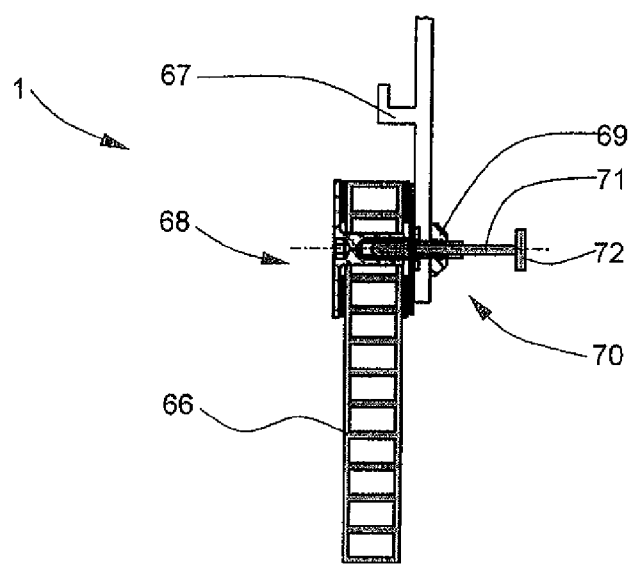

FIG. 7 shows a further vertically arranged lining panel 66 of the lining 1, which is fastened by means of a mount 68 to a horizontal extending (flat) profile 67, which represents part of the lining framework that is connected to the fuselage structure. The mount 68 has in turn a plastic nut 69 as a predetermined breaking point 70, in order to make a defined detachment of the lining panel 66 from the profile 67 possible when there is a sudden drop in pressure in the interior space 7.

The construction of the mount 68 is substantially the same as that of the mount 46 from FIGS. 5 and 6, a rod 71 with a stop 72 having a smaller length on account of the profile 67 being formed as a flat profile. In addition, an outer holder of the mount 68 is not formed in a bar-shaped manner, as in the case of the mount 46, but in a circular manner.

What is claimed is:

1. A lining for a fuselage cell of an aircraft, comprising:
   at least one lining panel; and
   an intermediate space existing between the fuselage cell and the lining, wherein the at least one lining panel has such a connection to the fuselage cell passing through the intermediate space that, when there is a rapid drop in pressure between an interior space of the fuselage cell and the intermediate space, the at least one lining panel exposes at least one gap to allow pressure equalization, wherein the at least one lining panel extends substantially horizontally and the connection of the at least one lining panel to the fuselage cell takes place by at least one tensioned cable, the at least one lining panel being supported against at least two supports which can be adjusted in length and are fastened to the fuselage cell.

2. The lining according to claim 1, wherein, starting from a first articulation point in a region of a first edge of the at least one lining panel, the cable is led over a first cable guide, arranged on one support of the at least two supports, over at least one holding point, fastened in the central region of the lining panel, and, from the holding point, the cable is led further over a second cable guide, arranged on the support, to a second articulation point in the region of a second edge, lying opposite the first edge.

3. The lining according to claim 2, wherein the at least one holding point has a predetermined breaking point in such a way that the holding point gives way above a critical load-bearing capacity of the at least one lining panel.

4. The lining according to claim 2, wherein the at least one holding point is formed by a threaded bolt which has a third cable guide.

5. The lining according to claim 4, wherein the at least one holding point formed by a threaded bolt which has a third cable guide is fastened by means of a plastic nut as a predetermined breaking point in the at least one lining panel.

6. The lining according to claim 1, wherein a length of the at least one cable is dimensioned in such a way that uncontrolled lowering of the at least one lining panel is prevented.

7. The lining according to claim 1, wherein the at least one lining panel adjoins another lining panel, wherein the lining panels have seals in each case along the edges of the lining panels and adjoin one another in a pressuretight manner.

* * * * *